US009439103B2

(12) United States Patent
Pesola et al.

(10) Patent No.: US 9,439,103 B2
(45) Date of Patent: Sep. 6, 2016

(54) SYSTEMS, METHODS, AND APPARATUSES FOR MODEM COORDINATION

(75) Inventors: Mikko Pesola, Marynummi (FI); Petri Vasenkari, Turku (FI); Tommi Auranen, Turku (FI); Woonhee Hwang, Espoo (FI); Sabine Rossel, Munich (DE); Michael Schopp, Ulm (DE); Sari Nielsen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 82 days.

(21) Appl. No.: 13/521,728

(22) PCT Filed: Dec. 22, 2010

(86) PCT No.: PCT/FI2010/051080
§ 371 (c)(1),
(2), (4) Date: Sep. 10, 2012

(87) PCT Pub. No.: WO2011/086229
PCT Pub. Date: Jul. 21, 2011

(65) Prior Publication Data
US 2013/0022095 A1  Jan. 24, 2013

Related U.S. Application Data

(60) Provisional application No. 61/294,998, filed on Jan. 14, 2010.

(51) Int. Cl.
*H04B 15/00* (2006.01)
*H04W 28/04* (2009.01)
(Continued)

(52) U.S. Cl.
CPC ......... *H04W 28/048* (2013.01); *H04W 76/027* (2013.01); *H04W 88/08* (2013.01)

(58) Field of Classification Search
CPC .............................. H04W 36/30; H04W 36/24
USPC ................................ 370/332, 329, 310, 324
See application file for complete search history.

(56) References Cited

U.S. PATENT DOCUMENTS

2004/0127163 A1* 7/2004 Schramm .............. H04W 36/20
455/67.11
2006/0246936 A1* 11/2006 Gross et al. ................... 455/522
(Continued)

OTHER PUBLICATIONS

International Search Report and Written Opinion received for corresponding International Patent Application No. PCT/FI2010/051080, dated Apr. 18, 2011, 11 pages.
(Continued)

*Primary Examiner* — Andrew Lai
*Assistant Examiner* — Zhiren Qin
(74) *Attorney, Agent, or Firm* — Mintz Levin Cohn Ferris Glovsky and Popeo, P.C.

(57) ABSTRACT

Methods, apparatuses, and systems are provided for modem coordination. A method may include establishing a coordinated communication session with a base station on a first communication channel. The method may further include causing transmission, to the base station, of an indication of an occurrence of an irregular transmission of data on a second communication channel. The second communication channel may be with a station logically separated from the base station. The base station maybe configured to respond to the indication of the occurrence of the irregular transmission by modifying transmission on the first communication channel to avoid interfering with the irregular transmission. The method may additionally include causing transmission, to the base station, of an indication of completion of the irregular transmission to allow the base station to resume normal transmission on the first communication channel. Corresponding apparatuses and systems are also provided.

23 Claims, 6 Drawing Sheets

(51) Int. Cl.
  *H04W 76/02* (2009.01)
  *H04W 88/08* (2009.01)

(56) References Cited

U.S. PATENT DOCUMENTS

| | | | |
|---|---|---|---|
| 2008/0056133 A1* | 3/2008 | Deshpande et al. | 370/235 |
| 2008/0081663 A1 | 4/2008 | Kasslin et al. | |
| 2008/0101446 A1 | 5/2008 | Gautier et al. | |
| 2008/0159327 A1 | 7/2008 | Pernu | |
| 2008/0192703 A1* | 8/2008 | Suzuki | H04W 76/048 370/335 |
| 2009/0168800 A1 | 7/2009 | Leinonen et al. | |
| 2009/0180451 A1 | 7/2009 | Alpert et al. | |
| 2009/0186616 A1* | 7/2009 | Kim et al. | 455/436 |
| 2010/0111214 A1* | 5/2010 | Chin | H04W 36/0083 375/267 |
| 2010/0172310 A1* | 7/2010 | Cheng et al. | H04W 64/00 370/329 |
| 2011/0256884 A1* | 10/2011 | Kazmi | H04W 48/04 455/456.1 |

OTHER PUBLICATIONS

EP Application No. 20080104488, "Method and device for data processing and communication system comprising such device", filed on Jun. 20, 2008, 35 pages.

* cited by examiner

SYSTEMS, METHODS, AND APPARATUSES FOR MODEM COORDINATION

RELATED APPLICATION

This application was originally filed as PCT Application No. PCT/FI2010/051080 filed Dec. 22, 2010, which claims priority benefit to U.S. Provisional Patent Application No. 61/294,998, filed Jan. 14, 2010.

TECHNOLOGICAL FIELD

Embodiments of the present invention relate generally to communication technology and, more particularly, relate to systems, methods, and apparatuses for modem coordination.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer and providing convenience to users.

Modern communication devices including, for example, wireless user equipment (UE), may support new services such as mobile television (TV) and long term evolution (LTE) cellular radio services at the same time. For example, a UE may allow a user to record a TV program during a voice call or allow the user to browse the internet while watching TV on a UE. Examples of LTE services may include voice call with various call features and various data services. However, concurrent use of multiple services may cause interference between frequency channels allocated for the differences services. In this regard, frequency bands may be scarce resources and the allocated frequency bands for applications such as mobile TV services and LTE services may be in close proximity to each other on the frequency spectrum without any or with very narrow guard bands to separate the channels.

BRIEF SUMMARY OF SOME EXAMPLES OF THE INVENTION

Systems, methods, apparatuses, and computer program products are herein provided for modem coordination. The systems, methods, apparatuses, and computer program products provided in accordance with example embodiments of the invention may provide several advantages to network service providers, computing devices accessing network services, and computing device users. In this regard, systems, methods, apparatuses, and computer program products are provided that may facilitate coordination between multiple modems on an apparatus having established communication channels with a plurality of separate logical stations so as to avoid or reduce interference between the communication channels, such as due to spectral proximity between frequency bands used to facilitate the communication channels. In this regard, example embodiments provide a signaling mechanism to enable a time-multiplexing scheme for a regular stream of bursts, such as, for example, mobile television downlink data bursts. Example embodiments of the invention further provide signaling between an apparatus and a base station to facilitate modem coordination where a modem is engaged in communication over a communication channel having irregular busy patterns. Some example embodiments provide for coordination between modems connected to different logical base station sites to support extended carrier aggregation. Example embodiments of the invention facilitate both time-domain and frequency domain coordination.

In a first example embodiment, a method is provided, which comprises establishing a coordinated communication session with a base station on a first communication channel. The method of this embodiment further comprises causing transmission, to the base station, of an indication of an occurrence of an irregular transmission of data on a second communication channel. The second communication channel of this embodiment is with a station logically separated from the base station. The base station of this embodiment is configured to respond to the indication of the occurrence of the irregular transmission by modifying transmission on the first communication channel to avoid interfering with the irregular transmission. The method of this embodiment additionally comprises causing transmission, to the base station, of an indication of completion of the irregular transmission to allow the base station to resume normal transmission on the first communication channel.

In another example embodiment, an apparatus is provided. The apparatus of this embodiment comprises at least one processor and at least one memory storing computer program code, wherein the at least one memory and stored computer program code are configured to, with the at least one processor, cause the apparatus to at least establish a coordinated communication session with a base station on a first communication channel. The at least one memory and stored computer program code are configured to, with the at least one processor, further cause the apparatus of this embodiment to cause transmission, to the base station, of an indication of an occurrence of an irregular transmission of data on a second communication channel. The second communication channel of this embodiment is with a station logically separated from the base station. The base station of this embodiment is configured to respond to the indication of the occurrence of the irregular transmission by modifying transmission on the first communication channel to avoid interfering with the irregular transmission. The at least one memory and stored computer program code are configured to, with the at least one processor, additionally cause the apparatus of this embodiment to cause transmission, to the base station, of an indication of completion of the irregular transmission to allow the base station to resume normal transmission on the first communication channel.

In another example embodiment, a computer program product is provided. The computer program product of this embodiment includes at least one computer-readable storage medium having computer-readable program instructions stored therein. The program instructions of this embodiment comprise program instructions configured to establish a coordinated communication session with a base station on a first communication channel. The program instructions of this embodiment further comprise program instructions configured to cause transmission, to the base station, of an indication of an occurrence of an irregular transmission of data on a second communication channel. The second communication channel of this embodiment is with a station logically separated from the base station. The base station of this embodiment is configured to respond to the indication of the occurrence of the irregular transmission by modifying transmission on the first communication channel to avoid interfering with the irregular transmission. The program instructions of this embodiment also comprise program instructions configured to cause transmission, to the base station, of an indication of completion of the irregular transmission to allow the base station to resume normal transmission on the first communication channel.

In another example embodiment, an apparatus is provided that comprises means for establishing a coordinated communication session with a base station on a first communication channel. The apparatus of this embodiment further comprises means for causing transmission, to the base station, of an indication of an occurrence of an irregular transmission of data on a second communication channel. The second communication channel of this embodiment is with a station logically separated from the base station. The base station of this embodiment is configured to respond to the indication of the occurrence of the irregular transmission by modifying transmission on the first communication channel to avoid interfering with the irregular transmission. The apparatus of this embodiment additionally comprises means for causing transmission, to the base station, of an indication of completion of the irregular transmission to allow the base station to resume normal transmission on the first communication channel.

In another example embodiment, a method is provided, which comprises establishing a coordinated communication session with a user equipment on a first communication channel. The method of this embodiment further comprises receiving an indication of an occurrence of an irregular transmission of data on a second communication channel between the user equipment and a station. The method of this embodiment additionally comprises modifying transmission on the first communication channel to avoid interfering with the irregular transmission. The method of this embodiment also comprises receiving an indication of completion of the irregular transmission. The method of this embodiment further comprises resuming normal transmission on the first communication channel in response to the indication of completion of the irregular transmission.

In another example embodiment, an apparatus is provided. The apparatus of this embodiment comprises at least one processor and at least one memory storing computer program code, wherein the at least one memory and stored computer program code are configured to, with the at least one processor, cause the apparatus to at least establish a coordinated communication session with a user equipment on a first communication channel. The at least one memory and stored computer program code are configured to, with the at least one processor, further cause the apparatus to receive an indication of an occurrence of an irregular transmission of data on a second communication channel between the user equipment and a station. The at least one memory and stored computer program code are configured to, with the at least one processor, additionally cause the apparatus to modify transmission on the first communication channel to avoid interfering with the irregular transmission. The at least one memory and stored computer program code are configured to, with the at least one processor, also cause the apparatus to receive an indication of completion of the irregular transmission. The at least one memory and stored computer program code are configured to, with the at least one processor, further cause the apparatus to resume normal transmission on the first communication channel in response to the indication of completion of the irregular transmission.

In another example embodiment, a computer program product is provided. The computer program product of this embodiment includes at least one computer-readable storage medium having computer-readable program instructions stored therein. The program instructions of this embodiment comprise program instructions configured to establish a coordinated communication session with a user equipment on a first communication channel. The program instructions of this embodiment further comprise program instructions configured to cause receipt of an indication of an occurrence of an irregular transmission of data on a second communication channel between the user equipment and a station. The program instructions of this embodiment additionally comprise program instructions configured to modify transmission on the first communication channel to avoid interfering with the irregular transmission. The program instructions of this embodiment also comprise program instructions configured to cause receipt of an indication of completion of the irregular transmission. The program instructions of this embodiment further comprise program instructions configured to resume normal transmission on the first communication channel in response to the indication of completion of the irregular transmission.

In another example embodiment, an apparatus is provided that comprises means for establishing a coordinated communication session with a user equipment on a first communication channel. The apparatus of this embodiment further comprises means for receiving an indication of an occurrence of an irregular transmission of data on a second communication channel between the user equipment and a station. The apparatus of this embodiment additionally comprises means for modifying transmission on the first communication channel to avoid interfering with the irregular transmission. The apparatus of this embodiment also comprises means for receiving an indication of completion of the irregular transmission. The apparatus of this embodiment further comprises means for resuming normal transmission on the first communication channel in response to the indication of completion of the irregular transmission.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
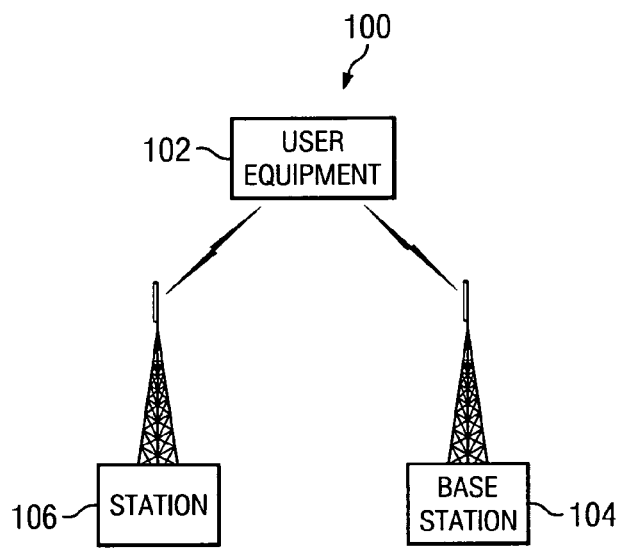
FIG. 1 illustrates a block diagram of a system for facilitating modem coordination according to an example embodiment of the present invention.

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

FIG. 1 illustrates a block diagram of a system 100 for facilitating modem coordination according to an example embodiment of the present invention. It will be appreciated that the system 100 as well as the illustrations of other figures are each provided as an example of one embodiment of the invention and should not be construed to narrow the scope or spirit of the invention in any way. In this regard, the scope of the invention encompasses many potential embodiments in addition to those illustrated and described herein. As such, while FIG. 1 illustrates one example of a configuration of a system for facilitating modem coordination, numerous other configurations may also be used to implement embodiments of the present invention.

In at least some embodiments, the system 100 includes an user equipment 102, a base station 104, and one or more stations 106. The base station 104 may comprise, for example, an access point, base station, or the like, that is configured to provide network access and/or other data service to the user equipment 102 via a communication channel established between the user equipment 102 and base station 104. The base station 104 may, for example, comprise a Node B of a Universal Mobile Telecommunications System (UMTS) Terrestrial Radio Access Network (UTRAN), evolved Node B(eNB) of an evolved UTRAN (E-UTRAN), eNB of a Long Term Evolution (LTE) network, eNB of an LTE-Advanced network, and/or the like. In this regard, the base station 104 may comprise an entity configured to provide access to services provided by a public land mobile network. The public land mobile network may, for example, comprise a network operating in accordance with, UTRAN standards, E-UTRAN standards, LTE standards, LTE-A standards, and/or the like.

The station 106 may comprise any entity configured to broadcast data to and/or receive data from an user equipment 102 over a communication channel established with the station 106. In this regard, the station 106 may comprise another base station 104. In embodiments wherein the station 106 comprises a base station 104, the base stations 104 may or may not be collocated and may or may not be coordinated via a core network. Additionally or alternatively, the station 106 may comprise a television transmitting station configured to provide mobile television services. In this regard, the station 106 may be configured to provide mobile television services in accordance with Digital Multimedia Broadcast (DMB), Digital Video Broadcasting-Handheld (DVB-H), Media Forward Link Only (Media-FLO), Terrestrial DMB (T-DMB) standards, and/or the like. As another example, the station 106 may comprise a wireless access point for a wireless local area network (WLAN), metropolitan area network (MAN), and/or the like. In this regard, the station 106 may, for example, be configured to use unlicensed white space frequency(ies) to provide network access or other services to an user equipment 102. It will be appreciated that while only a single station 106 is illustrated in FIG. 1, the system 100 may comprise a plurality of stations 106.

The user equipment 102 may be embodied as any computing device, such as, for example, a desktop computer, laptop computer, mobile terminal, mobile computer, mobile phone, mobile communication device, game device, digital camera/camcorder, audio/video player, television device, radio receiver, digital video recorder, positioning device, headset, any combination thereof, and/or the like. In this regard, the user equipment 102 may be embodied as any computing device to engage in communication over communication channels established with the base station 104 and one or more stations 106. The user equipment 102 may comprise a plurality of modems. The plurality of modems may be used to facilitate communication over communication channels established with stations (e.g., base stations 104, stations 106, and/or the like). In an example embodiment, each modem of the user equipment 102 that is engaged in communication with a station may be engaged in communication with a separate logical station entity. In this regard, for an example user equipment 102 having two modems, the first modem may be used to facilitate communication with the base station 104 over a first communication channel and the second modem may be used to facilitate communication with the station 106 over a second communication channel.

Figure 2:
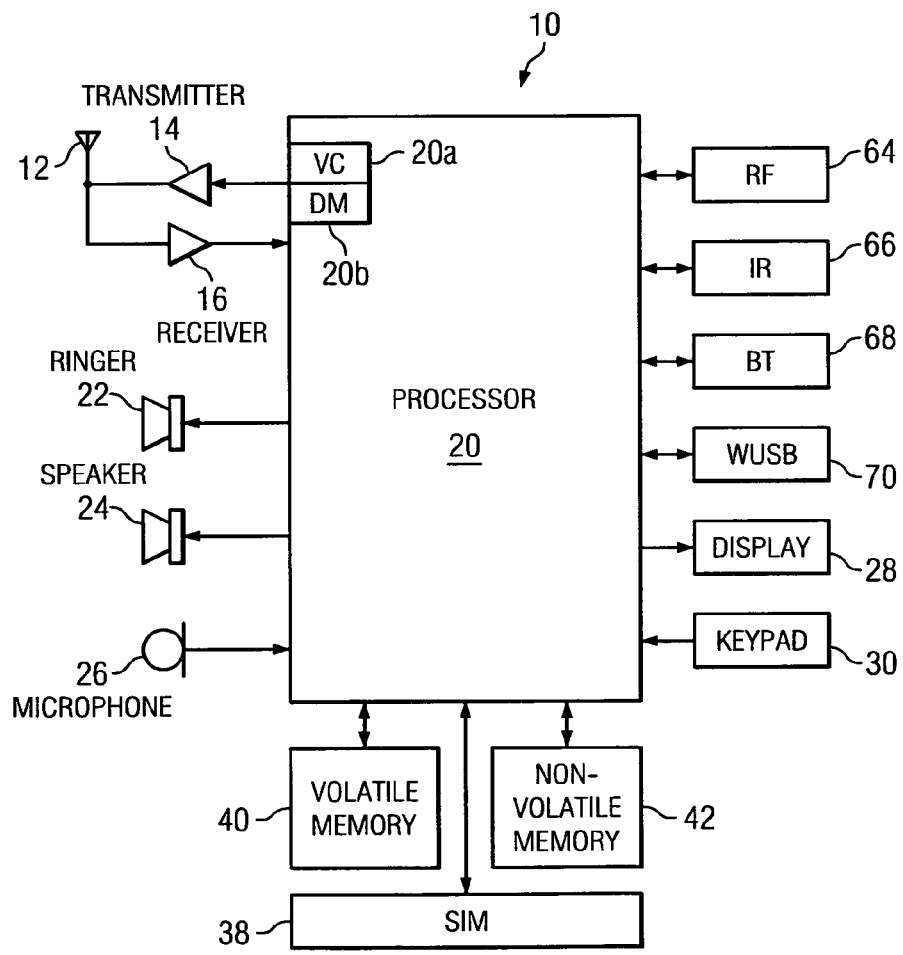
FIG. 2 is a schematic block diagram of a mobile terminal according to an example embodiment of the present invention.

In an example embodiment, the user equipment 102 is embodied as a mobile terminal, such as that illustrated in FIG. 2. In this regard, FIG. 2 illustrates a block diagram of a mobile terminal 10 representative of one embodiment of an user equipment 102 in accordance with embodiments of the present invention. It should be understood, however, that the mobile terminal 10 illustrated and hereinafter described is merely illustrative of one type of user equipment 102 that may implement and/or benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (for example, session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (for example, digital/analog or TDMA/CDMA/analog phones). Additionally, the mobile terminal 10 may be capable of operating according to Wireless Fidelity (Wi-Fi) or Worldwide Interoperability for Microwave Access (Wi-MAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20*a*, an internal data modem (DM) 20*b*, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (for example, software and/or firmware) stored on a memory accessible to the processor 20 (for example, volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (for example, Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, IEEE 802.15 techniques, IEEE 802.16 techniques, and/or the like.

The mobile terminal 10 may comprise memory, such as a subscriber identity module (SIM) 38, a universal subscriber identity module (USIM), a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Figure 3:
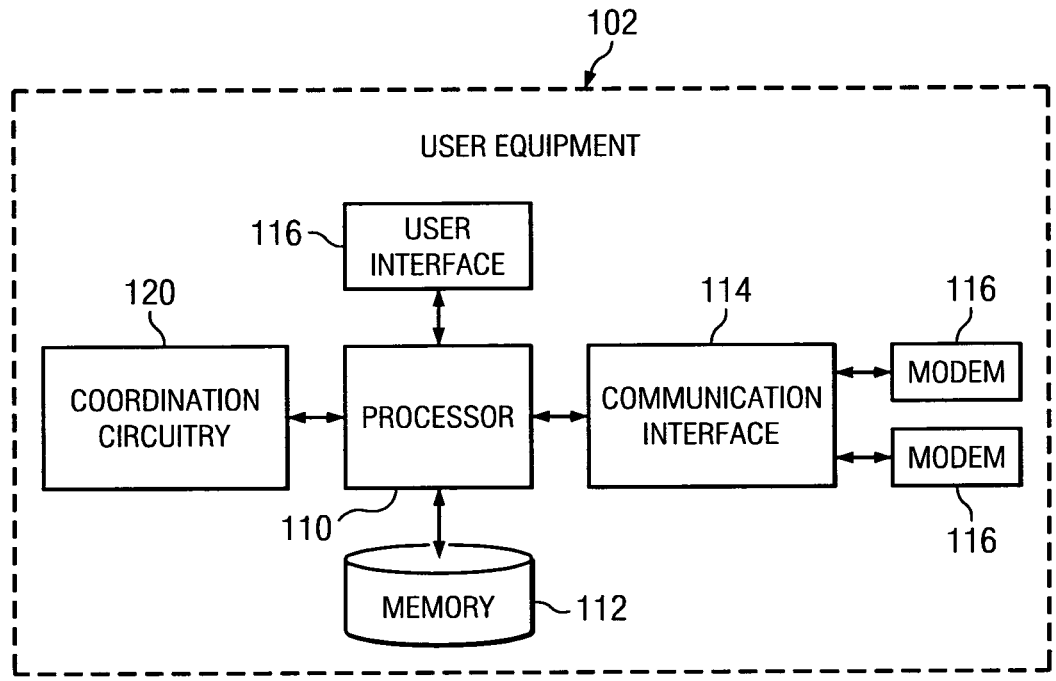
FIG. 3 illustrates a block diagram of an user equipment for facilitating modem coordination according to an example embodiment of the invention.

Referring now to FIG. 3, FIG. 3 illustrates a block diagram of an user equipment 102 for facilitating modem coordination according to an example embodiment of the invention. In the example embodiment illustrated in FIG. 3, the user equipment 102 may include various means, such as a processor 110, memory 112, a communication interface 114 including a plurality of modems 116, user interface 118, and coordination circuitry 120 for performing the various functions herein described. These means of the user equipment 102 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example, memory 112) that is executable by a suitably configured processing device (for example, the processor 110), or some combination thereof.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 3 as a single processor, in some embodiments the processor 110 comprises a plurality of processors. The plurality of processors may be in operative communication with each other and may be collectively configured to perform one or more functionalities of the user equipment 102 as described herein. In embodiments wherein the user equipment 102 is embodied as a mobile terminal 10, the processor 110 may be embodied as or comprise the processor 20. In an example embodiment, the processor 110 is configured to execute instructions stored in the memory 112 or otherwise accessible to the processor 110. These instructions, when executed by the processor 110, may cause the user equipment 102 to perform one or more of the functionalities of the user equipment 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. Although illustrated in FIG. 3 as a single memory, the memory 112 may comprise a plurality of memories. In various embodiments, the memory 112 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the user equipment 102 is embodied as a mobile terminal 10, the memory 112 may comprise the volatile memory 40 and/or the non-volatile memory 42. The memory 112 may be configured to store information, data, applications, instructions, or the like for enabling the user equipment 102 to carry out various functions in accordance with example embodiments of the present invention. For example, in at least some embodiments, the memory 112 is configured to buffer input data for processing by the processor 110. Additionally or alternatively, in at least some embodiments, the memory 112 is configured to store program instructions for execution by the processor 110. The memory 112 may store information in the form of static and/or dynamic information. This stored information may be stored and/or used by coordination circuitry 120 during the course of performing its functionalities.

The communication interface 114 may be embodied as any device or means embodied in circuitry, hardware, a computer program product comprising computer readable program instructions stored on a computer readable medium (for example, the memory 112) and executed by a processing device (for example, the processor 110), or a combination thereof that is configured to receive and/or transmit data from/to an entity of the system 100, such as, for example, a base station 104 and/or station 106. In at least one embodiment, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more entities of the system 100. The communication interface 114 may be configured to receive and/or transmit data using any protocol that may be used for communications between entities of the system 100. In this regard, the communication interface 114 may be configured to receive and/or transmit data via electromagnetic transmissions (e.g., radio waves) in accordance with any protocol that may be used by a base station 104 and/or station 106. In an example embodiment, the communication interface 114 comprises a plurality of modems 116 that may be used by the communication interface 114 for receiving and/or transmitting signals to/from one or more base stations 104, stations 106, and/or the like via one or more communication channels. In this regard, each modem 116 may be configured to engage in communication with a base station 104 and/or station 106 so as to receive and/or transmit data from/to the base station 104 and/or station 106 via a communication channel established with the base station 104 and/or station 106. In an example wherein the user equipment 102 has established a communication channel with a base station 104 and with a station 106, a first modem 116 may facilitate communication with the base station 104 over a first communication channel and a second modem 116 may facilitate communication with the station 106 over the second communication channel. The communication interface 114 may additionally be in communication with the memory 112, user interface 118, and/or coordination circuitry 120, such as via a bus.

The user interface 118 may be in communication with the processor 110 to receive an indication of a user input and/or to provide an audible, visual, mechanical, or other output to a user. As such, the user interface 118 may include, for example, a keyboard, a mouse, a joystick, a display, a touch screen display, a microphone, a speaker, and/or other input/output mechanisms. The user interface 118 may be in communication with the memory 112, communication interface 114, and/or coordination circuitry 120, such as via a bus.

The coordination circuitry 120 may be embodied as various means, such as circuitry, hardware, a computer program product comprising computer readable program instructions stored on a computer readable medium (for example, the memory 112) and executed by a processing device (for example, the processor 110), or some combination thereof and, in one embodiment, is embodied as or otherwise controlled by the processor 110. In embodiments wherein the coordination circuitry 120 is embodied separately from the processor 110, the coordination circuitry 120 may be in communication with the processor 110. The coordination circuitry 120 may further be in communication with one or more of the memory 112, communication interface 114, or user interface 118, such as via a bus.

Figure 4:
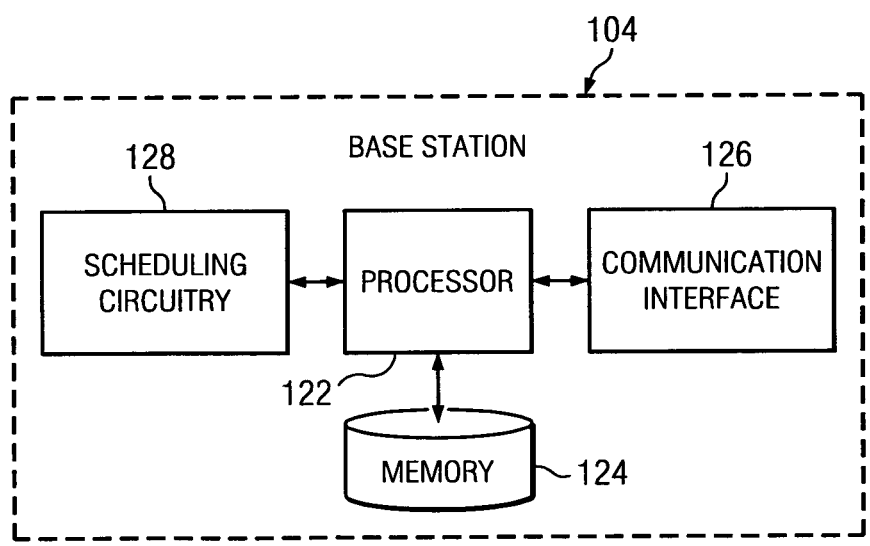
FIG. 4 illustrates a block diagram of a base station for facilitating modem coordination according to an example embodiment of the invention.

FIG. 4 illustrates a block diagram of a base station 104 for facilitating modem coordination according to an example embodiment of the invention. In example embodiments wherein the station 106 comprises a second base station 104, the station 106 may also comprise the elements and/or structure illustrated in the block diagram of FIG. 4. In the example embodiment illustrated in FIG. 4, the base station 104 may include various means, such as a processor 122, memory 124, communication interface 126, and scheduling circuitry 128 for performing the various functions herein described. These means of the base station 104 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example, memory 124) that is executable by a suitably configured processing device (for example, the processor 122), or some combination thereof.

The processor 122 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 4 as a single processor, in some embodiments the processor 122 comprises a plurality of processors. The plurality of processors may be in operative communication with each other and may be collectively configured to perform one or more functionalities of the base station 104 as described herein. The plurality of processors may be embodied on a single computing device or may be distributed across a plurality of computing devices collectively configured to perform one or more functionalities of the base station 104 as described herein. In an example embodiment, the processor 122 is configured to execute instructions stored in the memory 124 or otherwise accessible to the processor 122. These instructions, when executed by the processor 122, may cause the base station 104 to perform one or more of the functionalities of the base station 104 as described herein. As such, whether configured by hardware or software methods, or by a combination thereof, the processor 122 may comprise an entity capable of performing operations according to embodiments of the present invention while configured accordingly. Thus, for example, when the processor 122 is embodied as an ASIC, FPGA or the like, the processor 122 may comprise specifically configured hardware for conducting one or more operations described herein. Alternatively, as another example, when the processor 122 is embodied as an executor of instructions, such as may be stored in the memory 124, the instructions may specifically configure the processor 122 to perform one or more algorithms and operations described herein.

The memory 124 may comprise, for example, volatile memory, non-volatile memory, or some combination thereof. Although illustrated in FIG. 4 as a single memory, the memory 124 may comprise a plurality of memories. The plurality of memories may be embodied on a single computing device or distributed across a plurality of computing devices that may collectively comprise the base station 104. In various embodiments, the memory 124 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 124 may be configured to store information, data, applications, instructions, or the like for enabling the base station 104 to carry out various functions in accordance with example embodiments of the present invention. For example, in at least some embodiments, the memory 124 is configured to buffer input data for processing by the processor 122. Additionally or alternatively, in at least some embodiments, the memory 124 is configured to store program instructions for execution by the processor 122. The memory 124 may store information in the form of static and/or dynamic information. This stored information may be stored and/or used by scheduling circuitry 128 during the course of performing its functionalities.

The communication interface 126 may be embodied as any device or means embodied in circuitry, hardware, a computer program product comprising computer readable program instructions stored on a computer readable medium (for example, the memory 124) and executed by a processing device (for example, the processor 122), or a combination thereof that is configured to receive and/or transmit data from/to an entity of the system 100, such as, for example, an user equipment 102. In at least one embodiment, the communication interface 126 is at least partially embodied as or otherwise controlled by the processor 122. In this regard, the communication interface 126 may be in communication with the processor 122, such as via a bus. The communication interface 126 may include, for example, an antenna, a transmitter, a receiver, a transceiver and/or supporting hardware or software for enabling communications with one or more entities of the system 100. The communication interface 126 may be configured to receive and/or transmit data using any protocol that may be used for communications between entities of the system 100. In this regard, the communication interface 126 may be configured to receive and/or transmit data via electromagnetic transmissions (e.g., radio waves) in accordance with any communication protocol that may be used for communication with an user equipment 102. The communication interface 126 may additionally be in communication with the memory 124 and/or scheduling circuitry 128, such as via a bus.

The scheduling circuitry 128 may be embodied as various means, such as circuitry, hardware, a computer program product comprising computer readable program instructions stored on a computer readable medium (for example, the memory 124) and executed by a processing device (for example, the processor 122), or some combination thereof and, in one embodiment, is embodied as or otherwise controlled by the processor 122. In embodiments wherein the scheduling circuitry 128 is embodied separately from the processor 122, the scheduling circuitry 128 may be in communication with the processor 122. The scheduling circuitry 128 may further be in communication with the memory 124 and/or communication interface 126, such as via a bus.

Embodiments of the invention will now be further described with respect to the system of FIG. 1. In this regard, a first modem 116 of the user equipment 102 may be coupled to the base station 104 via a first communication link. The first communication link may, for example, be used for provision of cellular (e.g., LTE/LTE-A) services. A second modem 116 of the user equipment 102 may be coupled to the station 106 via a second communication link. The second communication link may, for example, be used for transmission of mobile television services. As another example, the second communication link may, for example, be used for provision of cellular (e.g., LTE/LTE-A) services. In this regard, the user equipment 102 may be coupled with multiple station entities to facilitate carrier aggregation. Transmission of data on the first communication link while data is being transmitted on the second communication link may cause interference to the data transmitted on the second communication link. Accordingly, the second modem 116 may be referred to as a "victim modem." Embodiments of the invention facilitate coordination between modems of the user equipment 102 to reduce and/or avoid such interference. Although embodiments of the invention are described with respect to use of two modems and two communication links, it will be appreciated that embodiments of the invention may be applied to facilitate coordination in cases in which the user equipment 102 has more than two modems 116, which are coupled to logically separate station entities (e.g., to the base station 104 and two or more stations 106).

In at least some example embodiments, the coordination circuitry 120 and scheduling circuitry 128 are configured to establish a coordinated communication session between the user equipment 102 and base station 104. Establishing the coordinated communication session may comprise the coordination circuitry 120 causing transmission of a coordinated communication session activation request to the base station 104. The coordinated communication session activation request may comprise a radio resource control (RRC) protocol message. The coordinated communication session activation request may additionally or alternatively use Layer 3 (L3) signaling.

The scheduling circuitry 128 may receive the coordinated communication session activation request. The scheduling circuitry 128 may be configured, in response to the coordinated communication session activation request, to cause transmission of a coordinated communication session activation response to the user equipment 102. The coordinated communication session activation response may comprise a radio resource control (RRC) protocol message. The coordinated communication session activation response may additionally or alternatively use Layer 3 (L3) signaling. The coordinated communication session activation response may comprise one or more coordination configuration parameters. The coordination configuration parameters may comprise RRC protocol extensions. The one or more coordination configuration parameters may comprise an indication of a coordination mode, an indication of whether a Level 1 (L1) and/or Level 2 (L2) signaling scheme is used to facilitate the coordination, an indication of an update period for resynchronization of the coordinated communication session, which may be expressed as one or more TTIs, and/or the like. The one or more coordination configuration parameters may additionally or alternatively comprise an indication of time advances expressed as one or more transmission time intervals (TTIs). The indication of time advances may, for example, facilitate activation of the coordinated communication session sufficiently in advance of a transmission on the second communication channel to allow for modem coordination.

The coordination circuitry 120 may be configured to receive a coordinated communication session activation response sent by the base station 104 and may cause transmission, in response to the coordinated communication session activation response, of a coordinated communication session activation confirmation to the base station 104. The coordinated communication session activation confirmation may serve to confirm the coordination session. The coordinated communication session activation confirmation may comprise a radio resource control (RRC) protocol message. The coordinated communication session activation confirmation may additionally or alternatively use Layer 3 (L3) signaling. The coordinated communication session activation confirmation may comprise one or more coordination configuration parameters.

The one or more coordination configuration parameters included in the coordinated communication session activation confirmation may comprise one or more coordination configuration parameters providing information about a regular transmission pattern on the second communication channel (and optionally on additional communication channels if more than two modems/channels are being coordinated). The coordination configuration parameters providing information about a regular transmission pattern on the second communication channel may comprise an indication of a number of transmission time intervals until a start of a transmission (e.g., a burst transmission) on the second communication channel, a number of transmission time intervals in a scheduled transmission (e.g., a burst transmission) on the second communication channel, a number of transmission time intervals in a scheduled transmission (e.g., a burst transmission) on the second communication channel plus a safety margin, and/or the like. Coordination configuration parameters providing information about a regular transmission pattern may further comprise a number of intervening transmission time intervals between regularly scheduled transmissions (e.g., burst transmissions) on the second communication channel, a number of intervening transmission time intervals between regularly scheduled transmissions (e.g., burst transmissions) on the second communication channel minus a safety margin, and/or the like.

The one or more coordination configuration parameters included in the coordinated communication session activation confirmation may additionally or alternatively include an additional maximum power reduction (A-MPR) parameter indicating a maximum power that may be used (e.g., by the base station 104) for transmission of data on the first communication channel during regular and/or irregular transmissions on the second communication channel, an indication of one or more signaling parameters used to inform the base station of occurrence of irregular transmissions on the second communication channel, and/or the like. The coordination configuration parameters may also comprise an indication of one or more allowed carrier frequencies that may be used for transmission of data on the first communication channel during regular and/or irregular transmissions on the second communication channel, an indication of one or more disallowed carrier frequencies that may not be used for transmission of data on the first communication channel during regular and/or irregular transmissions on the second communication channel, and/or the like. The indication(s) of allowed/disallowed carrier frequencies may be used by the scheduling circuitry 128 to facilitate frequency domain coordination between modems of the user equipment 102.

The scheduling circuitry 128 may be configured to receive the coordinated communication session activation confirmation and schedule transmission of data on the first communication channel based at least in part on the coordination configuration parameter(s) included in the coordinated communication session activation confirmation. In this regard, the scheduling circuitry 128 may be configured to determine when regular transmissions on the second communication channel are scheduled to occur based on the coordination configuration parameters and schedule transmission on the first communication channel around the regular transmission on the second communication channel to avoid causing interference to the transmission on the second communication channel. For example, the scheduling circuitry 128 may be configured to schedule transmissions on the first communication channel such that data is not transmitted by the base station 104 to the user equipment 102 on the first communication channel when regularly scheduled transmissions are occurring on the first communication channel. As another example, the scheduling circuitry 128 may be configured to schedule transmissions on the first communication channel such that transmissions occurring during a regularly scheduled transmission on the second channel are not made with a power greater than an A-MPR specified in the coordinated communication session activation confirmation. Accordingly, the scheduling circuitry 128 may be configured to take reduced user equipment 102 power headroom into account when a transmission on the first communication channel falls into a TTI colliding with a transmission on the second communication channel. As a further example, the scheduling circuitry 128 may be configured to schedule transmissions on the first communication channel such that transmissions occurring during a regularly scheduled transmission on the second channel are made on an allowed carrier frequency or carrier frequency band. In this regard, a transmission made on the first communication channel that overlaps in time with a transmission on the second communication channel may be made on a carrier frequency/frequency band specifically indicated as allowed in the coordinated communication session activation confirmation or on a carrier frequency/frequency band not indicated as disallowed in the coordinated communication session activation confirmation.

Figure 5:
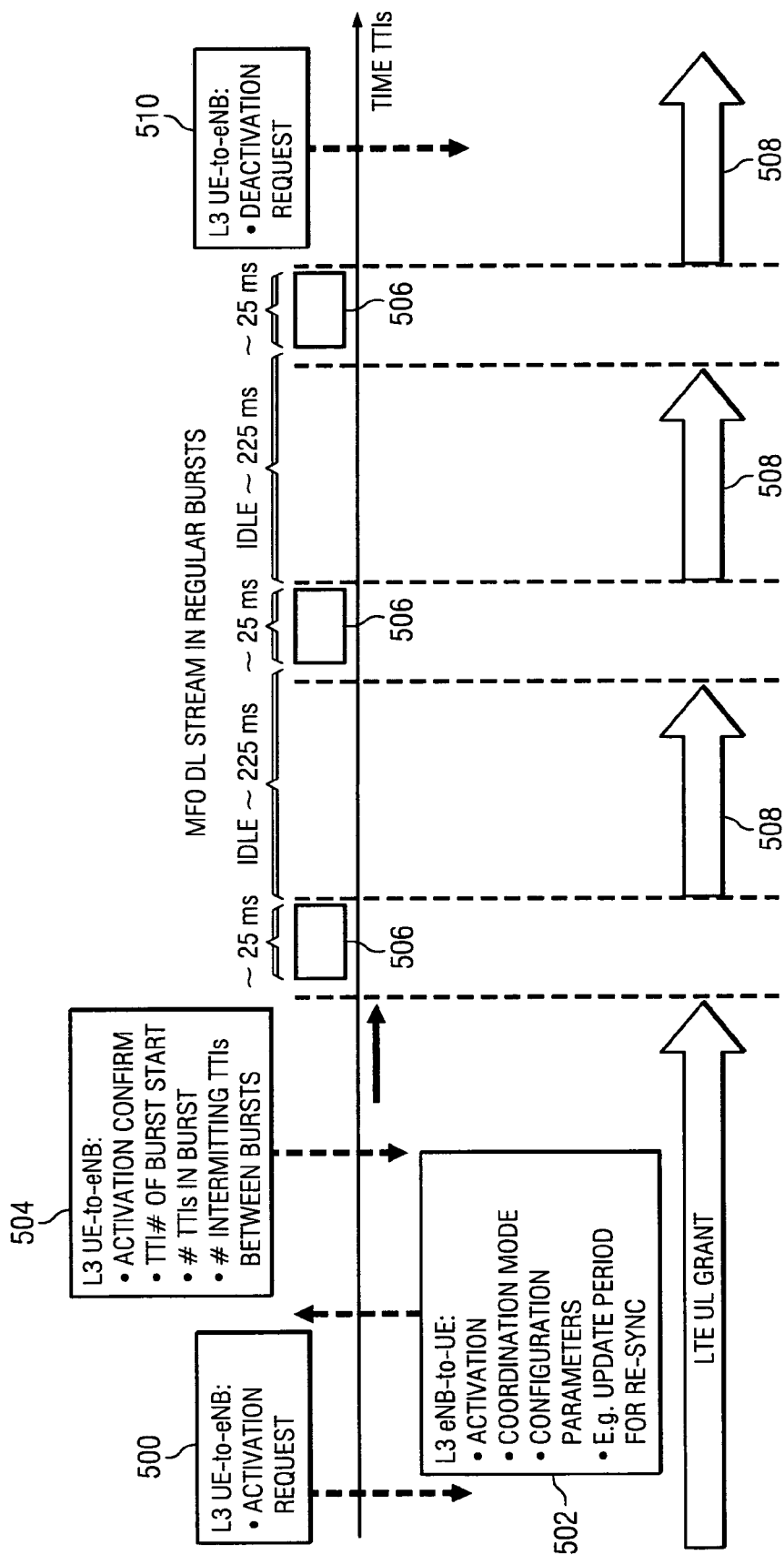
FIG. 5 illustrates a transmission timeline according to an example embodiment for facilitating modem coordination for regularly scheduled transmissions.

FIG. 5 illustrates a transmission timeline according to an example embodiment for modem coordination for regularly scheduled transmissions. In this regard, FIG. 5 illustrates a transmission timeline for an embodiment wherein the base station 104 comprises an eNB, the first communication channel comprises an LTE/LTE-A uplink (UL), and L3 signaling is used for establishing the coordinated communication session. Operation 500 may comprise the user equipment 102 transmitting a coordinated communication session activation request to the base station 104. Operation 502 may comprise the base station 104 transmitting a coordinated communication session activation response to the user equipment 102. Operation 504 may comprise the user equipment 102 transmitting a coordinated communication session activation confirmation to the base station 104.

In the embodiment of FIG. 5, all transmissions occurring on the second communication channel may comprise regularly scheduled transmission bursts. Accordingly, the coordinated communication session activation confirmation may include coordination configuration parameters indicating a length of the transmission bursts (e.g., in TTIs) and a length of an interval between scheduled transmission bursts (e.g., in TTIs). In the example of FIG. 5, the duration of the regularly scheduled transmission bursts is 25 milliseconds and the interval between the regularly scheduled transmission bursts is 225 milliseconds. Accordingly, the scheduling circuitry 128 may be configured to direct the base station 104 to not transmit data on the LTE UL during the regularly scheduled transmissions 506. During the intervals 508 between scheduled transmissions, the scheduling circuitry 128 may allow transmissions by the base station 104 on the LTE UL.

The coordination circuitry 120 may additionally be configured to cause transmission of a message to the base station 104 to request deactivation of the coordinated communication session. The request may comprise a L3 signaling message. An example of such a request is seen in operation 510 of FIG. 5. The scheduling circuitry 128 may be configured to receive a deactivation request sent by the user equipment 102 and may, in response to the request, terminate the coordinated communication session. The scheduling circuitry 128 may additionally be configured to cause transmission of a deactivation confirmation message and/or a deactivation response message to the user equipment 102 to confirm deactivation of the coordinated communication session. The deactivation confirmation and/or deactivation response message may comprise a L3 signaling message.

The coordination circuitry 120 and scheduling circuitry 128 may be further configured to resynchronize an established coordinated communication session. In this regard, the coordination circuitry 120 and scheduling circuitry 128 may be configured to exchange updated coordination configuration parameters. Resynchronization may be performed in response to a determination by the coordination circuitry 120 and/or scheduling circuitry 128 that resynchronization is needed. This determination may be made, for example, by determining an elapse of a predefined time period (e.g., a predefined number of TTIs) since establishment of the coordinated communication session or since a last resynchronization. This predefined time period may have been specified as a coordination configuration parameter during establishment of the coordinated communication session. As another example, the coordination circuitry 120 may determine that communication on the first communication channel is outside of a tolerable level of synchronization. In this regard, base station 104 transmissions on the first communication channel may be overlapping transmissions on the second communication channel, such as due to loss of time synchronization. Such loss of synchronization may lead to a level of interference on transmissions on the second communication channel that exceeds a tolerable limit. As another example, the coordination circuitry 120 may be configured to determine that resynchronization is needed if there is a change in a transmission pattern on the second communication channel. The coordination circuitry 120 may additionally or alternatively be configured to determine that resynchronization is needed if an additional (e.g., a third) communication channel is established between a modem of the user equipment 102 and a station 106. In this regard, coordination configuration parameters may need to be exchanged to allow coordination between the additional communication channel and the previously coordinated communication channels (e.g., the first and second communication channels).

In some instances, irregular transmissions may occur on the second communication channel. These irregular transmissions may occur in addition to or in lieu of regularly scheduled transmissions. Example embodiments of the invention provide for modem coordination to avoid interference with a victim modem in instances wherein the victim modem is sending and/or receiving irregular transmissions. In example embodiment, the coordination circuitry 120 is configured to determine an occurrence of an irregular transmission (e.g., a burst transmission) on the second communication channel. This irregular transmission may comprise data transmitted by the station 106 or by the user equipment 102. In this regard, the coordination circuitry 120 may, for example, be configured to determine occurrence of an irregular transmission by determining transmission and/or receipt of data by the modem coupled to the station 106 during an interval not regularly scheduled for transmission on the second communication channel.

The coordination circuitry 120 may be configured to cause transmission of an indication of a determined occurrence of an irregular transmission on the second communication channel to the base station 104. Causing transmission of the indication of the occurrence of the irregular transmission may comprise causing transmission of the indication using Layer 1 (L1) and/or Layer 2 (L2) signaling. The indication of the occurrence of the irregular transmission may, for example, comprise a receiver on (RX ON) parameter or a transmitter on (TX ON) parameter.

The scheduling circuitry 128 may be configured to receive the indication of the occurrence of the irregular transmission on the second communication channel and to modify transmission on the first communication channel in response to the received indication. In this regard, the scheduling circuitry 128 may, for example, be configured to cause the base station 104 to cease transmitting data on the first communication channel during the irregular transmission. As another example, the scheduling circuitry 128 may be configured to cause the base station 104 to reduce a maximum power for transmission on the first communication channel to reduce interference with the irregular transmission. The reduced maximum power level may, for example, comprise a reduced maximum lower level established during establishment of the coordinated communication session through a coordination configuration parameter. As a further example, the scheduling circuitry 128 may be configured to cause the base station 104 to restrict transmission on the first communication channel to one or more predefined allowable carrier frequencies to reduce interference with the irregular transmission. The allowable carrier frequencies may, for example, comprise one or more carrier frequencies established as allowable during establishment of the coordinated communication session through a coordination configuration parameter.

The coordination circuitry 120 may be additionally configured to determine completion of an irregular transmission on the second communication channel. In response to determining completion of the irregular transmission, the coordination circuitry 120 may be configured to cause transmission to the base station 104 of an indication of completion of the irregular transmission. Causing transmission of the indication of completion of the irregular transmission may comprise transmission of the indication using Layer 1 (L1) and/or Layer 2 (L2) signaling. The indication of completion of the irregular transmission may, for example, comprise a receiver off (RX OFF) parameter or a transmitter off (TX OFF) parameter.

The scheduling circuitry 120 may be configured, in response to receipt of the indication of completion of the irregular transmission, to resume normal transmission on the first communication channel. Resumption of normal transmission may comprise allowing the base station 104 to transmit data on the first communication channel within parameters allowed when irregular transmission is not occurring on the second communication channel. In this regard, the scheduling circuitry 120 may, for example, resume scheduling transfers on the first communication channel around regularly scheduled transmissions on the second communication channel.

Figure 6:
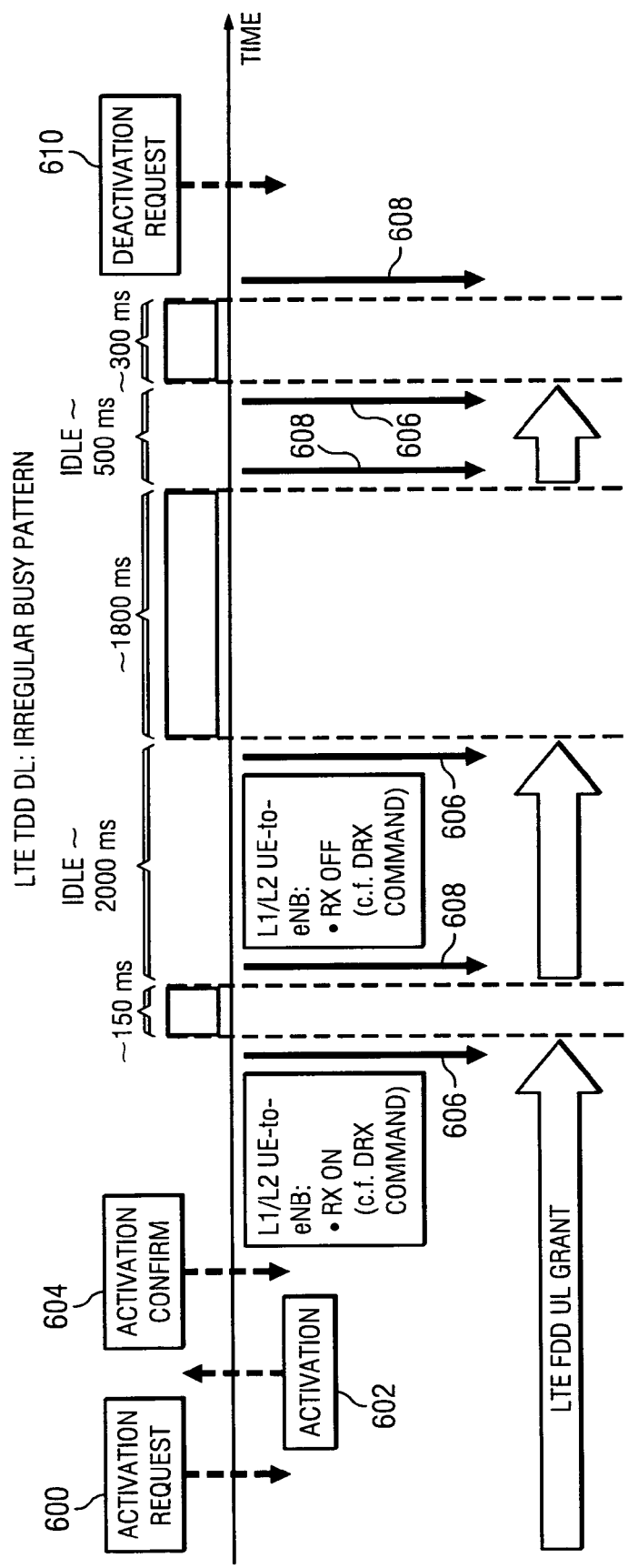
FIG. 6 illustrates a transmission timeline according to an example embodiment for facilitating modem coordination for irregular transmissions.

FIG. 6 illustrates a transmission timeline according to an example embodiment for modem coordination for irregular transmissions. More particularly, FIG. 6 illustrates a transmission timeline for an embodiment wherein the base station 104 comprises an eNB, the first communication channel comprises an LTE/LTE-A uplink (UL), and L3 signaling is used for establishing the coordinated communication session. The second channel in this example comprises an LTE/LTE-A time division duplex (TDD) downlink (DL) channel with the station 106. In this regard, FIG. 6 illustrates a scenario in which an LTE/LTE-A frequency division duplex (FDD) and an LTE/LTE-A TDD modem might be combined when use of both licensed and unlicensed frequency bands is supported by modems of the user equipment 102. In this scenario, the FDD modem may comprise a victim modem that may suffer interference from TDD transmissions. Additionally or alternatively, the TDD modem may suffer interference from FDD transmissions. Operation 600 may comprise the user equipment 102 transmitting a coordinated communication session activation request to the base station 104. Operation 602 may comprise the base station 104 transmitting a coordinated communication session activation response to the user equipment 102. Operation 604 may comprise the user equipment 102 transmitting a coordinated communication session activation confirmation to the base station 104.

As illustrated in FIG. 6, a plurality of irregular transmissions may occur on the DL channel between the user equipment 102 and station 106. The coordination circuitry 120 may detect irregular transmission on the DL, such as by detecting receipt of data by the modem coupled to the station 106 via the DL channel. In response to detection of an irregular transmission, the coordination circuitry 120 may cause the user equipment 102 to send an indication of an occurrence of an irregular transmission on the DL channel with the station 106 to the base station 104, as illustrated by each occurrence of operation 606 in FIG. 6. The indication of the occurrence of the irregular transmission may, for example, comprise an L1 and/or L2 signaling parameter. The L1 and/or L2 signaling parameter may, for example, comprise RX ON, TX ON, or the like. The scheduling circuitry 128 may be configured to cause the base station 104 to cease transmission of data to the user equipment 102 on the first communication channel in response to the indication of an occurrence of an irregular transmission. In response to determining completion of an irregular transmission on the DL channel with the station 106, the coordination circuitry 120 may cause the user equipment 102 to send an indication of completion of an irregular transmission to the base station 104, as illustrated by each occurrence of operation 608 in FIG. 6. The indication of completion of the irregular transmission may, for example, comprise an L1 and/or L2 signaling parameter. The L1 and/or L2 signaling parameter may, for example, comprise RX OFF, TX OFF, or the like. The scheduling circuitry 128 may resume normal scheduling of transmissions on the first communication channel in response to receipt of an indication of completion of an irregular transmission. Operation 610 may comprise the coordination circuitry 120 causing transmission of a message to the base station 104 to request deactivation of the coordinated communication session.

Figure 7:
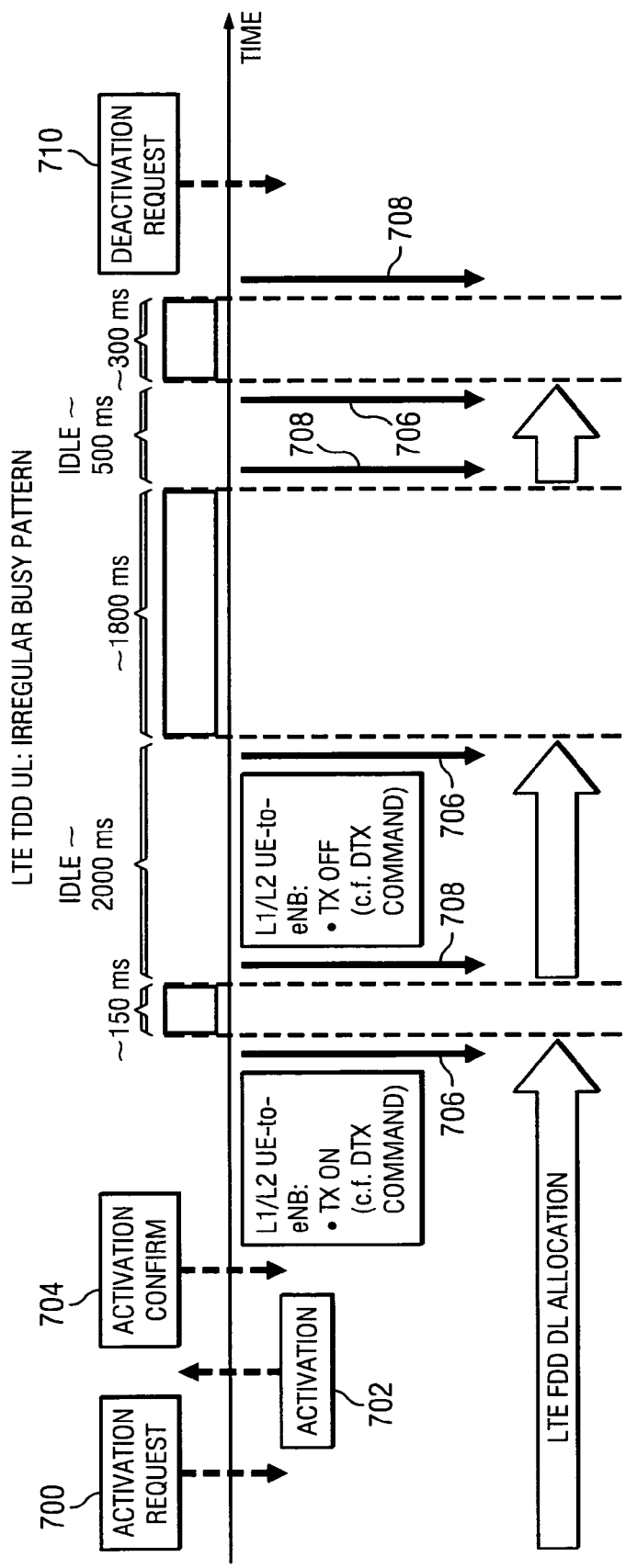
FIG. 7 illustrates a transmission timeline according to an example embodiment for facilitating modem coordination for irregular transmissions.

FIG. 7 illustrates a transmission timeline according to an example embodiment for facilitating modem coordination for irregular transmissions. In this regard, FIG. 7 illustrates a transmission timeline for an embodiment wherein the base station 104 comprises an eNB, the first communication channel comprises an LTE/LTE-A Frequency Division Duplex (FDD) downlink (DL), and L3 signaling is used for establishing the coordinated communication session. The second channel in this example comprises an LTE/LTE-A TDD UL channel with the station 106. Operation 700 may comprise the user equipment 102 transmitting a coordinated communication session activation request to the base station 104. Operation 702 may comprise the base station 104 transmitting a coordinated communication session activation response to the user equipment 102. Operation 704 may comprise the user equipment 102 transmitting a coordinated communication session activation confirmation to the base station 104.

As illustrated in FIG. 7, a plurality of irregular transmissions may occur on the UL channel between the user equipment 102 and station 106. The coordination circuitry 120 may detect irregular transmission on the UL, such as by detecting transmission of data by the modem coupled to the station 106 via the UL channel. In response to detection of an irregular transmission, the coordination circuitry 120 may cause the user equipment 102 to send an indication of an occurrence of an irregular transmission on the UL channel with the station 106 to the base station 104, as illustrated by each occurrence of operation 706 in FIG. 7. The indication of the occurrence of the irregular transmission may, for example, comprise an L1 and/or L2 signaling parameter. The L1 and/or L2 signaling parameter may, for example, comprise RX ON, TX ON, or the like. The scheduling circuitry 128 may be configured to cause the base station 104 to cease transmission of data to the user equipment 102 on the first communication channel in response to the indication of an occurrence of an irregular transmission. In response to determining completion of an irregular transmission on the UL channel with the station 106, the coordination circuitry 120 may cause the user equipment 102 to send an indication of completion of an irregular transmission to the base station 104, as illustrated by each occurrence of operation 708 in FIG. 7. The indication of completion of the irregular transmission may, for example, comprise an L1 and/or L2 signaling parameter. The L1 and/or L2 signaling parameter may, for example, comprise RX OFF, TX OFF, or the like. The scheduling circuitry 128 may resume normal scheduling of transmissions on the first communication channel in response to receipt of an indication of completion of an irregular transmission. Operation 710 may comprise the coordination circuitry 120 causing transmission of a message to the base station 104 to request deactivation of the coordinated communication session.

Embodiments of the invention further provide for coordination of two or more LTE/LTE-Advanced modems operating simultaneously in an extended (LTE-Advanced) carrier aggregation scheme. For example, a first LTE/LTE-A modem may be coupled to a base station 104 using a 900 MHz carrier frequency and a second LTE/LTE-A modem may be coupled to the station 106 using an 1800 MHz carrier frequency. In this scenario, interference mitigation via LTE-Advanced Carrier Aggregation scheduler cannot be established as two separate LTE/LTE-Advanced modems are deployed on the same UE platform. Based on the example embodiments described above, the LTE/LTE-Advanced modems can be coordinated in frequency position of aggressor allocation and victim allocation or in time domain. In this regard, as further described above, coordination configuration parameters may be exchanged during establishment of a coordinated communication session that specify allocated transmission time slots, allocated carrier frequencies, prohibited carrier frequencies, and/or the like.

Embodiments of the invention further facilitate a user equipment-performed prioritization process. For example, if an LTE-Advanced modem (lower frequency layer) and an LTE-Advanced modem (higher frequency layer) are embodied on the user equipment 102, and if further mutual interference is possible (e.g. through $2^{nd}$ order harmonics), the coordination circuitry 120 or scheduling circuitry 128 may be configured to determine which modem is the coordination master. The determined coordination master modem may be the modem responsible for establishing and configuring a coordinated communication session. This prioritization process may be performed in two scenarios. In a first scenario, two (or more) modems of the user equipment 102 may be coupled via communication channels to the same base station 104 or to a base station 104 and station 106 belonging to the same network. In a second scenario, a first modem of the user equipment 102 may be coupled via a communication channel to a base station 104 and a second modem of the user equipment 102 may be coupled to a station 106, which may reside on a network separate from that of the first base station 104.

In scenarios in which both modems are connected to the same base station 104 or to a base station 104 and station 106 belonging to the same network, the scheduling circuitry 128 may be configured to cause the base station 104 to signal configuration parameters for a user equipment-performed prioritization process. Since in this case, both modems that may require coordination may be able to obtain coordination assistance from a base station 104, the coordination circuitry 120 may determine which modem will have prioritization for the coordinated communication session connection and cause the user equipment 102 to send an indication of the determination to the base station 104. The scheduling circuitry 128 may determine which modem of the user equipment 102 is to be the coordination master. This determination may be made based on the prioritization indicated by the user equipment 102. The scheduling circuitry 128 may further cause the base station 104 to signal to the user equipment 102 which modem has been determined as the coordination master. The signals and messages exchanged between the user equipment 102 and base station 104 for facilitating the user equipment-performed prioritization process may be performed via any appropriate signaling protocol, such as via L3 and/or L1/L2 signaling.

In scenarios wherein a first modem of the user equipment 102 is coupled via a communication channel to a base station 104 and a second modem of the user equipment 102 is coupled to a station 106 on a network separate from that of the base station 104, the coordination circuitry 120 may be configured to determine which modem of the user equipment 102 is the coordination matter. The coordination circuitry 120 may cause the user equipment 102 to send an indication of the determined coordination master to the base station 104 that is facilitating the coordinated communication session.

Figure 8:
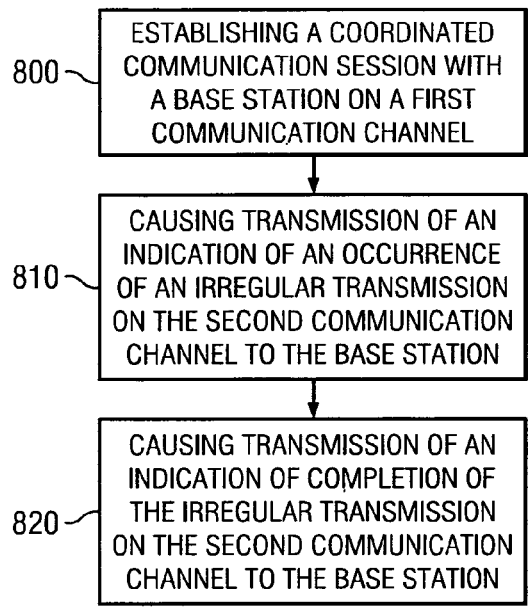
FIG. 8 illustrates a flowchart according to an example method for facilitating modem coordination according to an example embodiment of the invention.

FIG. 8 illustrates a flowchart according to an example method for facilitating modem coordination according to an example embodiment of the invention. In this regard, FIG. 8 illustrates operations that may, for example, be performed at the user equipment 102. The operations illustrated in and described with respect to FIG. 8 may, for example, be performed by and/or under control of one or more of the processor 110, memory 112, communication interface 114, user interface 118, or the coordination circuitry 120. Operation 800 may comprise establishing a coordinated communication session with a base station on a first communication channel. Operation 810 may comprise causing transmission of an indication of an occurrence of an irregular transmission on the second communication channel to the base station. Operation 820 may comprise causing transmission of an indication of completion of the irregular transmission on the second communication channel to the base station.

Figure 9:
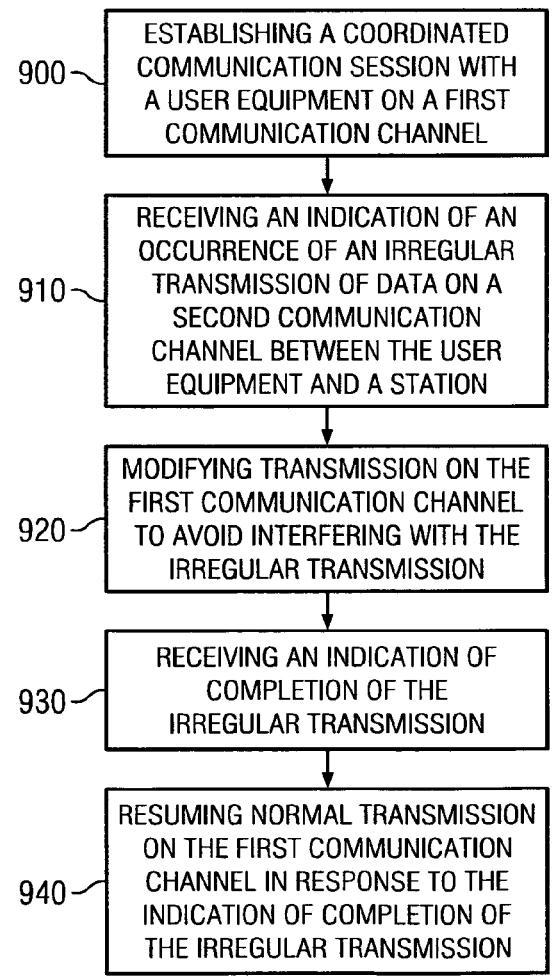
FIG. 9 illustrates a flowchart according to an example method for facilitating modem coordination according to an example embodiment of the invention.

FIG. 9 illustrates a flowchart according to an example method for facilitating modem coordination according to an example embodiment of the invention. In this regard, FIG. 9 illustrates operations that may, for example, be performed at the base station 104. The operations illustrated in and described with respect to FIG. 9 may, for example, be performed by and/or under control of one or more of the processor 122, memory 124, communication interface 126, or scheduling circuitry 128. Operation 900 may comprise establishing a coordinated communication session with a user equipment on a first communication channel. Operation 910 may comprise receiving an indication of an occurrence of an irregular transmission of data on a second communication channel between the user equipment and a station. Operation 920 may comprise modifying transmission on the first communication channel to avoid interfering with the irregular transmission. Operation 930 may comprise receiving an indication of completion of the irregular transmission. Operation 940 may comprise resuming normal transmission on the first communication channel in response to the indication of completion of the irregular transmission.

FIGS. 8-9 are flowcharts of a system, method, and computer program product according to example embodiments of the invention. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device and executed by a processor in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories (e.g., memory 112 and/or memory 124) on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, an user equipment 102 and/or base station 104) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (e.g., the processor 110 and/or processor 122) may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

In a first example embodiment, a method is provided, which comprises establishing a coordinated communication session with a base station on a first communication channel. The method of this embodiment further comprises causing transmission, to the base station, of an indication of an occurrence of an irregular transmission of data on a second communication channel. The irregular transmission may, for example, comprise an irregular burst transmission. The second communication channel of this embodiment is with a station logically separated from the base station. The base station of this embodiment is configured to respond to the indication of the occurrence of the irregular transmission by modifying transmission on the first communication channel to avoid interfering with the irregular transmission. The method of this embodiment additionally comprises causing transmission, to the base station, of an indication of completion of the irregular transmission to allow the base station to resume normal transmission on the first communication channel.

Modifying transmission on the first communication channel may comprise one or more of ceasing data transmission on the first communication channel during the irregular transmission, reducing a maximum power for transmission on the first communication channel, or restricting transmission on the first communication channel to one or more predefined allowable carrier frequencies. Modifying transmission on the first communication channel may comprise modifying transmission on the first communication channel based at least in part on one or more coordination configuration parameters established for the coordinated communication session. Resumption of normal transmission on the first communication channel may comprise resuming transmission as needed and/or as scheduled within parameters allowed when irregular transmission is not occurring on the second communication channel.

The method of this embodiment may additionally comprise determining an occurrence of an irregular transmission on the second communication channel. Causing transmission of the indication of the occurrence of the irregular transmission of data on a second communication channel may comprise causing transmission of the indication in response to the determination.

Establishing the coordinated communication session may comprise establishing the coordinated communication session using Layer 3 (L3) signaling. Causing transmission of the indication of the occurrence of the irregular transmission may comprise causing transmission of the indication using Layer 1 (L1) and/or Layer 2 (L2) signaling. The indication of the occurrence of the irregular transmission may comprise a receiver on (RX ON) parameter or a transmitter on (TX ON) parameter. Causing transmission of the indication of completion of the irregular transmission may comprise transmission of the indication using Layer 1 (L1) and/or Layer 2 (L2) signaling. The indication of completion of the irregular transmission may comprise a receiver off (RX OFF) parameter or a transmitter off (TX OFF) parameter.

Establishing the coordinated communication session may comprise causing transmission of a coordinated communication session activation request to the base station. Establishing the coordinated communication session may further comprise receiving a coordinated communication session activation response sent by the base station. The coordinated communication session activation response may comprise one or more coordination configuration parameters. The one or more coordination configuration parameters included in the coordinated communication session activation response may comprise an indication of time advances expressed as one or more transmission time intervals (TTIs) and/or an indication of an update period for resynchronization of the coordinated communication session expressed as one or more transmission time intervals.

Establishing the coordinated communication session may additionally comprise causing transmission of a coordinated communication session activation confirmation to the base station. The coordinated communication session activation confirmation may comprise one or more coordination configuration parameters. The one or more coordination configuration parameters included in the coordinated communication session activation confirmation may include one or more coordination configuration parameters providing information about a regular transmission pattern on the second communication channel. The coordination configuration parameters providing information about a regular transmission pattern on the second communication channel may comprise one or more of an indication of a number of transmission time intervals until a start of a transmission on the second communication channel, a number of transmission time intervals in a scheduled transmission on the second communication channel, a number of transmission time intervals in a scheduled transmission on the second communication channel plus a safety margin, a number of intervening transmission time intervals between regularly scheduled transmissions on the second communication channel, or a number of intervening transmission time intervals between regularly scheduled transmissions on the second communication channel minus a safety margin. The one or more coordination configuration parameters included in the coordinated communication session activation confirmation may additionally or alternatively include one or more of an additional maximum power reduction (A-MPR) parameter indicating a maximum power that may be used for transmission of data on the first communication channel during regular and/or irregular transmissions on the second communication channel, an indication of one or more allowed carrier frequencies that may be used for transmission of data on the first communication channel during regular and/or irregular transmissions on the second communication channel, an indication of one or more disallowed carrier frequencies that may not be used for transmission of data on the first communication channel during regular and/or irregular transmissions on the second communication channel, or an indication of one or more signaling parameters used to inform the base station of occurrence of irregular transmissions on the second communication channel.

The method may also comprise determining that resynchronization of the coordinated communication session is required. Determining that resynchronization of the coordinated communication session is required may comprise one or more of determining an elapse of a predefined number of transmission time intervals, determining an elapse of a predefined time period, or determining that communication is outside of a tolerable level of synchronization. The method may further comprise resynchronizing the coordinated communication session with the base station in response to determining that resynchronization of the coordinated communication session is required.

The method may additionally comprise causing transmission of a message to the base station to deactivate the coordinated communication session.

The first communication channel may comprise a communication channel supporting Long Term Evolution and/or Long Term Evolution-Advanced communication services. The base station may comprise a Node B or an evolved Node B. The second communication channel may comprise a communication channel supporting mobile television services, network access services, Long Term Evolution communication services, or Long Term Evolution-Advanced communication services. The station may comprise a mobile television transmission station, a wireless network access point, a wireless local area network access point, a wireless metropolitan area network access point, a cellular access point, a base station, a Node B, or an evolved Node B.

In another example embodiment, an apparatus is provided. The apparatus of this embodiment comprises at least one processor and at least one memory storing computer program code, wherein the at least one memory and stored computer program code are configured to, with the at least one processor, cause the apparatus to at least establish a coordinated communication session with a base station on a first communication channel. The at least one memory and stored computer program code are configured to, with the at least one processor, further cause the apparatus of this embodiment to cause transmission, to the base station, of an indication of an occurrence of an irregular transmission of data on a second communication channel. The irregular transmission may, for example, comprise an irregular burst transmission. The second communication channel of this embodiment is with a station logically separated from the base station. The base station of this embodiment is configured to respond to the indication of the occurrence of the irregular transmission by modifying transmission on the first communication channel to avoid interfering with the irregular transmission. The at least one memory and stored computer program code are configured to, with the at least one processor, additionally cause the apparatus of this embodiment to cause transmission, to the base station, of an indication of completion of the irregular transmission to allow the base station to resume normal transmission on the first communication channel.

In another example embodiment, a computer program product is provided. The computer program product of this embodiment includes at least one computer-readable storage medium having computer-readable program instructions stored therein. The program instructions of this embodiment comprise program instructions configured to establish a coordinated communication session with a base station on a first communication channel. The program instructions of this embodiment further comprise program instructions configured to cause transmission, to the base station, of an indication of an occurrence of an irregular transmission of data on a second communication channel. The irregular transmission may, for example, comprise an irregular burst transmission. The second communication channel of this embodiment is with a station logically separated from the base station. The base station of this embodiment is configured to respond to the indication of the occurrence of the irregular transmission by modifying transmission on the first communication channel to avoid interfering with the irregular transmission. The program instructions of this embodiment also comprise program instructions configured to cause transmission, to the base station, of an indication of completion of the irregular transmission to allow the base station to resume normal transmission on the first communication channel.

In another example embodiment, an apparatus is provided that comprises means for establishing a coordinated communication session with a base station on a first communication channel. The apparatus of this embodiment further comprises means for causing transmission, to the base station, of an indication of an occurrence of an irregular transmission of data on a second communication channel. The second communication channel of this embodiment is with a station logically separated from the base station. The base station of this embodiment is configured to respond to the indication of the occurrence of the irregular transmission by modifying transmission on the first communication channel to avoid interfering with the irregular transmission. The apparatus of this embodiment additionally comprises means for causing transmission, to the base station, of an indication of completion of the irregular transmission to allow the base station to resume normal transmission on the first communication channel.

In another example embodiment, a method is provided, which comprises establishing a coordinated communication session with a user equipment on a first communication channel. The method of this embodiment further comprises receiving an indication of an occurrence of an irregular transmission of data on a second communication channel between the user equipment and a station. The irregular transmission may, for example, comprise an irregular burst transmission. The method of this embodiment additionally comprises modifying transmission on the first communication channel to avoid interfering with the irregular transmission. The method of this embodiment also comprises receiving an indication of completion of the irregular transmission. The method of this embodiment further comprises resuming normal transmission on the first communication channel in response to the indication of completion of the irregular transmission.

Modifying transmission on the first communication channel may comprise one or more of ceasing data transmission on the first communication channel during the irregular transmission, reducing a maximum power for transmission on the first communication channel, or restricting transmission on the first communication channel to one or more predefined allowable carrier frequencies. Modifying transmission on the first communication channel may comprise modifying transmission on the first communication channel based at least in part on one or more coordination configuration parameters established for the coordinated communication session. Resuming normal transmission on the first communication channel may comprise resuming transmission as needed and/or as scheduled within parameters allowed when irregular transmission is not occurring on the second communication channel.

Establishing the coordinated communication session may comprise establishing the coordinated communication session using Layer 3 (L3) signaling. Receiving the indication of the occurrence of the irregular transmission may comprise receiving the indication using Layer 1 (L1) and/or Layer 2 (L2) signaling. The indication of the occurrence of the irregular transmission may comprise an receiver on (RX ON) parameter or a transmitter on (TX ON) parameter. Receiving the indication of completion of the irregular transmission may comprise receiving the indication using Layer 1 (L1) and/or Layer 2 (L2) signaling. The indication of completion of the irregular transmission may comprise a receiver off (RX OFF) parameter or a transmitter off (TX OFF) parameter.

Establishing the coordinated communication session may comprise receiving a coordinated communication session activation sent by the user equipment. Establishing the coordinated communication session may further comprise causing transmission of a coordinated communication session activation response to the user equipment. The coordinated communication session activation response may comprise one or more coordination configuration parameters. The one or more coordination configuration parameters included in the coordinated communication session activation response may comprise an indication of time advances expressed as one or more transmission time intervals (TTIs) and/or an indication of an update period for resynchronization of the coordinated communication session expressed as one or more transmission time intervals.

Establishing the coordinated communication session may additionally comprise receiving a coordinated communication session activation confirmation to the base station. The coordinated communication session activation confirmation may comprise one or more coordination configuration parameters. The one or more coordination configuration parameters included in the coordinated communication session activation confirmation may include one or more coordination configuration parameters providing information about a regular transmission pattern on the second communication channel. The coordination configuration parameters providing information about a regular transmission pattern on the second communication channel may comprise one or more of an indication of a number of transmission time intervals until a start of a transmission on the second communication channel, a number of transmission time intervals in a scheduled transmission on the second communication channel, a number of transmission time intervals in a scheduled transmission on the second communication channel plus a safety margin, a number of intervening transmission time intervals between regularly scheduled transmissions on the second communication channel, or a number of intervening transmission time intervals between regularly scheduled transmissions on the second communication channel minus a safety margin. The one or more coordination configuration parameters included in the coordinated communication session activation confirmation may additionally or alternatively include one or more of an additional maximum power reduction (A-MPR) parameter indicating a maximum power that may be used for transmission of data on the first communication channel during regular and/or irregular transmissions on the second communication channel, an indication of one or more allowed carrier frequencies that may be used for transmission of data on the first communication channel during regular and/or irregular transmissions on the second communication channel, an indication of one or more disallowed carrier frequencies that may not be used for transmission of data on the first communication channel during regular and/or irregular transmissions on the second communication channel, or an indication of one or more signaling parameters used by the user equipment for informing of occurrence of irregular transmissions on the second communication channel.

The method may further comprise resynchronizing the coordinated communication session with the user equipment. The method may additionally comprise receiving a message sent by the user equipment requesting deactivation of the coordinated communication session and deactivating the coordinated communication session in response thereto.

The first communication channel may comprise a communication channel supporting Long Term Evolution and/or Long Term Evolution-Advanced communication services. The first communication channel may be between the user equipment and a base station. The base station may comprise a Node B or an evolved Node B. The second communication channel may comprise a communication channel supporting mobile television services, network access services, Long Term Evolution communication services, or Long Term Evolution-Advanced communication services. The station may comprise a mobile television transmission station, a wireless network access point, a wireless local area network access point, a wireless metropolitan area network access point, a cellular access point, a base station, a Node B, or an evolved Node B.

In another example embodiment, an apparatus is provided. The apparatus of this embodiment comprises at least one processor and at least one memory storing computer program code, wherein the at least one memory and stored computer program code are configured to, with the at least one processor, cause the apparatus to at least establish a coordinated communication session with a user equipment on a first communication channel. The at least one memory and stored computer program code are configured to, with the at least one processor, further cause the apparatus to receive an indication of an occurrence of an irregular transmission of data on a second communication channel between the user equipment and a station. The irregular transmission may, for example, comprise an irregular burst transmission. The at least one memory and stored computer program code are configured to, with the at least one processor, additionally cause the apparatus to modify transmission on the first communication channel to avoid interfering with the irregular transmission. The at least one memory and stored computer program code are configured to, with the at least one processor, also cause the apparatus to receive an indication of completion of the irregular transmission. The at least one memory and stored computer program code are configured to, with the at least one processor, further cause the apparatus to resume normal transmission on the first communication channel in response to the indication of completion of the irregular transmission.

In another example embodiment, a computer program product is provided. The computer program product of this embodiment includes at least one computer-readable storage medium having computer-readable program instructions stored therein. The program instructions of this embodiment comprise program instructions configured to establish a coordinated communication session with a user equipment on a first communication channel. The program instructions of this embodiment further comprise program instructions configured to cause receipt of an indication of an occurrence of an irregular transmission of data on a second communication channel between the user equipment and a station. The irregular transmission may, for example, comprise an irregular burst transmission. The program instructions of this embodiment additionally comprise program instructions configured to modify transmission on the first communication channel to avoid interfering with the irregular transmission. The program instructions of this embodiment also comprise program instructions configured to cause receipt of an indication of completion of the irregular transmission. The program instructions of this embodiment further comprise program instructions configured to resume normal transmission on the first communication channel in response to the indication of completion of the irregular transmission.

In another example embodiment, an apparatus is provided that comprises means for establishing a coordinated communication session with a user equipment on a first communication channel. The apparatus of this embodiment further comprises means for receiving an indication of an occurrence of an irregular transmission of data on a second communication channel between the user equipment and a station. The irregular transmission may, for example, comprise an irregular burst transmission. The apparatus of this embodiment additionally comprises means for modifying transmission on the first communication channel to avoid interfering with the irregular transmission. The apparatus of this embodiment also comprises means for receiving an indication of completion of the irregular transmission. The apparatus of this embodiment further comprises means for resuming normal transmission on the first communication channel in response to the indication of completion of the irregular transmission.

As such, then, some embodiments of the invention provide several advantages to network service providers, computing devices accessing network services, and computing device users. In this regard, systems, methods, apparatuses, and computer program products are provided that may facilitate coordination between multiple modems on an apparatus having established communication channels with a plurality of separate logical stations so as to avoid or reduce interference between the communication channels, such as due to spectral proximity between frequency bands used to facilitate the communication channels. In this regard, example embodiments provide a signaling mechanism to enable a time-multiplexing scheme for a regular stream of bursts, such as, for example, mobile television downlink data bursts. Example embodiments of the invention further provide signaling between an apparatus and a base station to facilitate modem coordination where a modem is engaged in communication over a communication channel having irregular busy patterns. Some example embodiments provide for coordination between modems connected to different logical base station sites to support extended carrier aggregation. Example embodiments of the invention facilitate both time-domain and frequency domain coordination.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. A method comprising:
    causing, by a user equipment, establishment of a coordinated communication session with a first base station on a first communication channel and with a second base station on a second communication channel;
    causing, by the user equipment, transmission of a coordinated communication session activation confirmation including one or more coordination configuration parameters indicative of a regular transmission pattern on the second communication channel; and
    causing, by the user equipment, transmission, to the first base station, of an indication of an occurrence of an irregular transmission of data on the second communication channel with the second base station, wherein the transmission of the indication is in response to detecting the irregular transmission of data on the second communication channel to enable the first base station to modify transmission on the first communication channel to avoid interfering with the irregular transmission, wherein the indication of the regular transmission on the second communication channel enables the user equipment to detect the irregular transmission on the second communication channel.

2. The method of claim 1, further comprising causing, by the user equipment, transmission, to the first base station, of an indication of completion of the irregular transmission to enable the first base station to resume normal transmission on the first communication channel.

3. The method of claim 1, further comprising:
    determining, by the user equipment, that the resynchronization of the coordinated communication session is required; and
    causing, by the user equipment, resynchronization of the coordinated communication session with the first base station in response to determining that resynchronization of the coordinated communication session is required.

4. The method of claim 1, wherein the one or more coordination configuration parameters about the regular transmission pattern on the second communication channel comprise an indication of a quantity of transmission time intervals until a start of a transmission on the second communication channel.

5. The method of claim 1, wherein the one or more coordination configuration parameters about the regular transmission pattern on the second communication channel comprise a quantity of transmission time intervals in a scheduled transmission on the second communication channel.

6. The method of claim 1, wherein the one or more coordination configuration parameters about the regular transmission pattern on the second communication channel comprise a quantity of transmission time intervals in a scheduled transmission on the second communication channel plus a safety margin.

7. The method of claim 1, wherein the user equipment includes a first modem to provide the coordinated communication with the first base station on the first communication channel and further includes a second modem to provide the coordinated communication with the second base station on the second communication channel.

8. The method of claim 7, wherein the coordinated communication session modifies communications on the first communication channel to avoid interference caused by the irregular transmission on the second communication channel.

9. An apparatus comprising at least one processor and at least one memory storing computer program code, wherein the at least one memory and stored computer program code are configured, with the at least one processor, to cause the apparatus to at least:

cause, by a user equipment, establishment of a coordinated communication session with a first base station on a first communication channel and with a second base station on a second communication channel;

causing, by the user equipment, transmission of a coordinated communication session activation confirmation including one or more coordination configuration parameters indicative of a regular transmission pattern on the second communication channel; and cause, by the user equipment, transmission, to the first base station, of an indication of an occurrence of an irregular transmission of data on the second communication channel with the second base station, wherein the transmission of the indication is in response to detecting the irregular transmission of data on the second communication channel to enable the first base station to modify transmission on the first communication channel to avoid interfering with the irregular transmission, wherein the indication of the regular transmission on the second communication channel enables the user equipment to detect the irregular transmission on the second communication channel.

10. The apparatus of claim 9, wherein the at least one memory and stored computer program code are configured, with the at least one processor, to further cause the apparatus to:

cause, by the user equipment, transmission, to the first base station, of an indication of completion of the irregular transmission to enable the first base station to resume normal transmission on the first communication channel.

11. The apparatus of claim 9, wherein the one or more coordination configuration parameters comprise an additional maximum power reduction parameter indicating a maximum power useable for transmission of data on the first communication channel during transmissions on the second communication channel.

12. The apparatus of claim 9, wherein the one or more coordination configuration parameters comprise one or more of an indication of one or more allowed carrier frequencies that are useable for transmission of data on the first communication channel during transmissions on the second communication channel or an indication of one or more disallowed carrier frequencies that are not useable for transmission of data on the first communication channel during transmissions on the second communication channel.

13. The apparatus of claim 9, wherein the at least one memory and stored computer program code are configured, with the at least one processor, to further cause the apparatus to:

determine, by the user equipment, that resynchronization of the coordinated communication session is required; and cause, by the user equipment, resynchronization of the coordinated communication session with the first base station in response to determining that resynchronization of the coordinated communication session is required.

14. A non-transitory computer program product comprising at least one computer-readable storage medium having computer-readable program instructions stored therein, the computer-readable program instructions comprising program instructions configured to cause an apparatus to perform a method comprising:

causing, by a user equipment, establishment of a coordinated communication session with a first base station on a first communication channel and with a second base station on a second communication channel;

causing, by the user equipment, transmission of a coordinated communication session activation confirmation including one or more coordination configuration parameters indicative of a regular transmission pattern on the second communication channel; and causing, by the user equipment, transmission, to the first base station, of an indication of an occurrence of an irregular transmission of data on the second communication channel with the second base station, wherein the transmission of the indication is in response to detecting the irregular transmission of data on the second communication channel to enable the first base station to modify transmission on the first communication channel to avoid interfering with the irregular transmission, wherein the indication of the regular transmission on the second communication channel enables the user equipment to detect the irregular transmission on the second communication channel.

15. A method comprising:

causing, by a first base station, establishment of a coordinated communication session with a user equipment on a first communication channel and with a second base station on a second communication channel;

causing, by the first base station, reception of a coordinated communication session activation confirmation including one or more coordination configuration parameters indicative of a regular transmission pattern on the second communication channel;

receiving, by the first base station, an indication of an occurrence of an irregular transmission of data on the second communication channel between the user equipment and the second base station, wherein the receiving the indication is in response to detecting, by the user equipment, the irregular transmission of data on the second communication channel, wherein the indication of the regular transmission on the second communication channel enables the user equipment to detect the irregular transmission on the second communication channel; and causing, by the first base station, modification of transmission on the first communication channel to avoid interfering with the irregular transmission on the second communication channel.

16. The method of claim 15, further comprising:

receiving, by the first base station, an indication of completion of the irregular transmission; and causing, by the first base station, resumption of normal transmission on the first communication channel in response to the indication of completion of the irregular transmission.

17. The method of claim 15, wherein causing, by the first base station, modification of transmission on the first communication channel comprises causing modification of transmission on the first communication channel based at least in part on one or more coordination configuration parameters established for the coordinated communication session.

18. The method of claim 15, wherein causing, by the first base station, modification of transmission on the first communication channel comprises one or more of causing cessation of data transmission on the first communication channel during the irregular transmission, reducing a maximum power for transmission on the first communication channel, or restricting transmission on the first communication channel to one or more predefined allowable carrier frequencies.

19. An apparatus comprising at least one processor and at least one memory storing computer program code, wherein the at least one memory and stored computer program code are configured, with the at least one processor, to cause the apparatus to at least:
cause, by a first base station, establishment of a coordinated communication session with a user equipment on a first communication channel and with a second base station on a second communication channel;
cause, by the first base station, reception of a coordinated communication session activation confirmation including one or more coordination configuration parameters indicative of a regular transmission pattern on the second communication channel;
receive, by the first base station, an indication of an occurrence of an irregular transmission of data on the second communication channel between the user equipment and the second base station, wherein the receive the indication is in response to detecting, by the user equipment, the irregular transmission of data on the second communication channel, wherein the indication of the regular transmission on the second communication channel enables the user equipment to detect the irregular transmission on the second communication channel; and
cause, by the first base station, modification of transmission on the first communication channel to avoid interfering with the irregular transmission on the second communication channel.

20. The apparatus of claim 19, wherein the at least one memory and stored computer program code are configured, with the at least one processor, to further cause the apparatus to:
receive, by the first base station, an indication of completion of the irregular transmission; and
cause, by the first base station, resumption of normal transmission on the first communication channel in response to the indication of completion of the irregular transmission.

21. The apparatus of claim 19, wherein the at least one memory and stored computer program code are configured, with the at least one processor, to cause the apparatus to cause, by the first base station, modification of transmission on the first communication channel based at least in part on one or more coordination configuration parameters established for the coordinated communication session.

22. The apparatus of claim 19, wherein the at least one memory and stored computer program code are configured, with the at least one processor, to cause the apparatus to cause, by the first base station, modification of transmission on the first communication channel at least in part by one or more of causing cessation of data transmission on the first communication channel during the irregular transmission, reducing a maximum power for transmission on the first communication channel, or restricting transmission on the first communication channel to one or more predefined allowable carrier frequencies.

23. A non-transitory computer program product comprising at least one computer-readable storage medium having computer-readable program instructions stored therein, the computer-readable program instructions comprising program instructions configured to cause an apparatus to perform a method comprising:
causing, by a first base station, establishment of a coordinated communication session with a user equipment on a first communication channel and with a second base station on a second communication channel;
causing, by the first base station, reception of a coordinated communication session activation confirmation including one or more coordination configuration parameters indicative of a regular transmission pattern on the second communication channel;
receiving, by the first base station, an indication of an occurrence of an irregular transmission of data on the second communication channel between the user equipment and the second base station, wherein the receiving the indication is in response to detecting, by the user equipment, the irregular transmission of data on the second communication channel, wherein the indication of the regular transmission on the second communication channel enables the user equipment to detect the irregular transmission on the second communication channel; and
causing, by the first base station, modification of transmission on the first communication channel to avoid interfering with the irregular transmission on the second communication channel.

* * * * *